Aug. 17, 1943.   F. KÖBER ET AL   2,326,951
OPTICAL SYSTEM FOR TAKING STEREOSCOPIC PHOTOGRAPHS
Filed Sept. 6, 1940
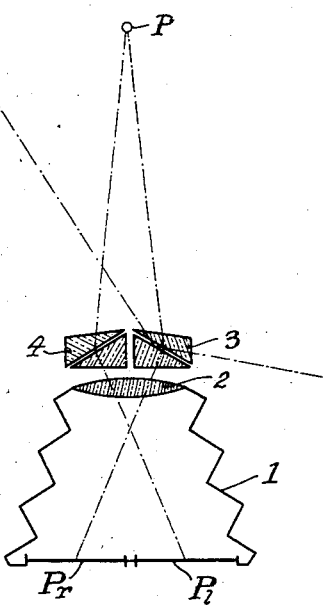
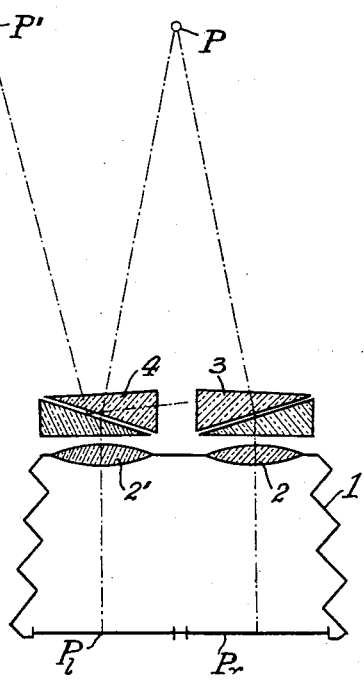
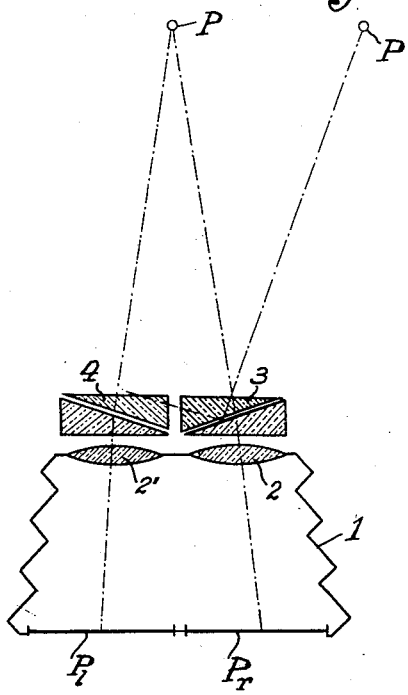
INVENTORS
Fritz Köber, Hans Sauer, Otto Vierling
BY Singer, Ehlert, Stein & Carlberg
ATTORNEYS Patented Aug. 17, 1943

2,326,951

UNITED STATES PATENT OFFICE 2,326,951

OPTICAL SYSTEM FOR TAKING STEREO-SCOPIC PHOTOGRAPHS

Fritz Köber, Hans Sauer, and Otto Vierling, Dresden, Germany; vested in the Alien Property Custodian Application September 6, 1940, Serial No. 355,620
In Germany September 27, 1939

5 Claims. (Cl. 95—18)

The U. S. Patent specification No. 2,222,300 of November 1940, Serial No. 235,926 refers to the use of a well known optical prism system in the image light ray path of a stereo projecting device, the limiting faces of said optical system being of different refractive index. In each stereoscopic ray path the rays producing a double picture strike these adjoining faces are at an angle that lies within the limit posed by the total reflection angle, and are reflected, while the rays of light producing the double image pass unobstructed.

The optical system employed in the above identified patent specification produces on the one hand such a deflection of the two light rays in the stereo projection that the stereoscopic pictures on the projection screen appear in superposition, and on the other hand by suitably placing the limiting faces and thereby suitably selecting the wedge angles said optical system causes the elimination of the double pictures owing to total reflection. In addition the above identified patent specification (U. S. Serial No. 235,926) employs optical systems which are constituted by achromatic prisms.

The same optical system may be used according to the present invention for taking stereoscopic photographies particularly close-ups.

It is well known to take stereoscopic photographies with only one objective by dividing it into two halves placed horizontally adjacent each other. In such a division of the lens the two stereoscopic pictures photographed by the two lens halves appear however in superposition on the light sensitive layer. Therefore it is necessary to separate the two pictures so that they can be placed side by side on the light sensitive layer. The optical system described in Patent specification No. 2,222,300 (U. S. Serial No. 235,926) can be adopted for this purpose. The invention is illustrated by means of example.

In the drawing:

Fig. 1 illustrates diagrammatically a camera for producing stereoscopic pictures by means of a single photographic objective, and Figs. 2 and 3 illustrate each diagrammatically a camera which is equipped with two photographic objectives for producing stereoscopic pictures.

Fig. 1 shows a photographic camera 1 in horizontal section. The camera lens designated by 2 is subdivided into two halves by the optical system described in the former application. As will be seen from the drawing the two wedge assemblies 3 and 4 which symmetrically subdivide the lens 2 are lying between the object P and the lens 2 near the latter. Each wedge assembly comprises two substantially right-angled prisms whose bases are considerably longer than the perpendicular sides thereof, and whose hypothenusal faces are arranged adjacent each other and are separated by an air space. The two wedge assemblies have the effect of projecting by the lens 2 in the film plane at $P_r$ a ray emanating from the object point P and striking the wedge assembly 3, while a ray striking the wedge assembly 4 is photographer by the objective 2 at $P_l$. In order to obtain a distinct limitation of the two stereoscopic pictures on the light sensitive layer the limiting faces between the two media of different refractive index of each wedge assembly are so arranged in the path of rays that rays emanating e. g. from a point P' which rays would interfere with the other stereoscopic picture strike the corresponding limiting face within the limit angle of the total reflection and therefore are not allowed to pass. Owing to the particular arrangement of the hypothenusal faces of the two wedge assemblies with respect to each other the wedge assemblies are only half as thick in axial direction than the corresponding prisms assemblies of the projecting device disclosed in the previously mentioned U. S. Patent specification 2,222,300.

An essential feature of this invention consists in the effective stereoscopic basis not being practically affected by the mounting of the prism system in front of the objective. This is particularly advantageous when taking stereoscopic close-ups.

The invention is applicable also to cameras with two objectives (Figs. 2 and 3).

In such cameras it is possible to limit the stereoscopic pictures in the well known way by fitting a diaphragm between the objectives and the film plane. In many cases especially when adapting ordinary cameras for such for stereoscopic pictures many difficulties occur owing to camera parts lying between the objectives and the film plane such as shutter, sector diaphragm or the like, the adaptation of a diaphragm not being generally or to a sufficient extent possible.

In these cases according to the invention the stereoscopic picture limitation may possibly be effected by a suitable deflection of the light rays (Fig. 2) and by fitting the optical system described in the former application in front of each objective.

In the arrangement according to Fig. 2 the prism systems are developed in such a way that a ray emanating from the object P and striking the prism assembly 3 is photographed in the film plane at Pr by the objective 2, while a ray striking the wedge assembly 4 is photographed by the objective 2' at Pl.

In the same way as by means of a single objective a distinct limitation of the two stereoscopic pictures on the light sensitive layer is obtained by arranging the limiting faces between the two media of different refractive index of the wedge assembly in the path of rays in such a way that rays proceeding e. g. from the point P' which rays would interfere with the other stereoscopic picture strike the corresponding limiting face within the limit angle of the total reflection and therefore are not allowed to pass.

The arrangement in Fig. 3 is effected in such a way that e. g. by approaching the objective centers in respect of the stereoscopic picture centers a ray emanating from the object P and striking the wedge assembly 3 is photographed without additional deflection by the prisms through the objective 2 in the film plane at Pr. This applies in a similar way for a ray striking the wedge assembly 4 which ray is photographed by the objective 2' at Pl. The wedge assembly thus acts in its entirety as a planoparallel plate.

The limitation of the stereoscopic pictures in respect to each other is effected in a similar way as in the arrangement in Figure 2.

The invention does not confine to the cases represented in the illustrations in which the stereoscopic pictures are placed side by side on the light sensitive layer in horizontal alignement. By suitably deflecting the light rays by arranging the limiting faces between the two media of different refractive index it is just as well possible to arrange the stereoscopic pictures on the light sensitive layer in vertical alignement.

By using e. g. picture rotating means the stereoscopic pictures may likewise be placed being rotated at 90°, side by side in horizontal or in vertical alignement.

What we claim as our invention is:

1. In a photographic camera for producing stereoscopic pictures, optical means for producing in the focal plane of the camera two separate pictures simultaneously of an object photographed, said optical means including two pairs of optical wedges for directing the light rays reflected from the object photographed into the camera, one pair of wedges for each picture to be produced, each wedge having a base which is considerably longer than the perpendicular side thereof and each pair of wedges being arranged with their hypothenusal faces adjacent each other and separated by an air space, said hypothenusal faces being positioned at such an angle to the optical axis of the camera that light rays reflected from other than the object photographed and which would interfere with the light rays passing through the other pair of optical wedges strike the hypothenusal faces within the limit angle of total reflection and are directed away from the focal plane, while the light rays reflected from the object photographed pass unobstructed through said faces to the focal plane of the camera.

2. In a photographic camera for producing stereoscopic pictures, optical means for producing on a light sensitive layer two separate pictures from an object photographed, said optical means including a photographic objective and two pairs of optical wedges mounted in front of said objective, one pair for each picture to be produced, said optical means producing from the object photographed two laterally displaced images in the focal plane of said photographic objective, each wedge having a base which is approximately half as long as the diameter of said objective and each pair of wedges being arranged with their hypothenusal faces adjacent each other and separated by an air space, said hypothenusal faces being positioned at such an angle to the optical axis of said objective that light rays reflected from other than the object photographed and which would interfere with the light rays passing through the other pair of optical wedges strike the hypothenusal faces within the limit angles of total reflection and are directed away from the focal plane, while the light rays reflected from the object photographed pass unobstructed through said faces to the focal plane of the camera.

3. In a photographic camera for producing stereoscopic pictures, optical means for producing on a light sensitive layer two separate pictures from an object photographed, said optical means including a photographic objective and two pairs of optical wedges mounted in front of said objective one pair for each picture to be photographed, each pair of said wedges covering one half of said objective, with the base of each wedge being half as long as the diameter of said objective, said optical means producing from the object photographed two laterally displaced images in the focal plane of said photographic objective, each pair of wedges being arranged with their hypothenusal faces adjacent each other and separated by an air space, said hypothenusal faces being positioned at such an angle to the optical axis of said objective that light rays reflected from other than the object photographed and which would interfere with the light rays passing through the other pair of optical wedges strike the hypothenusal faces within the limit angle of total reflection and are directed away from the focal plane, while the light rays reflected from the object photographed pass unobstructed through said faces to the focal plane of the camera.

4. In a photographic camera for producing stereoscopic pictures, optical means for producing on a light sensitive layer two separate pictures from an object photographed, said optical means including two photographic objectives, one for each picture to be produced, and two pairs of optical wedges, one pair for each objective and mounted in front of the same, said optical means producing from the object photographed two laterally displaced images in the focal plane of said objectives, each pair of wedges being arranged with their hypothenusal faces adjacent each other and separated by an air space, said hypothenusal faces being positioned at such an angle to the optical axis of its associated objective that light rays reflected from other than the object photographed and which would interfere with the light rays passing through the other pair of optical wedges strike the hypothenusal faces within the limit angle of total reflection and are directed away from the focal plane, while the light rays reflected from the object photographed pass unobstructed through said faces to the focal plane of the camera.

5. In a photographic camera for producing stereoscopic pictures, optical means for producing on a light sensitive layer two separate pictures from an object photographed, said optical means including two photographic objectives, one for each picture to be produced, and two pairs of optical wedges, one pair for each objective and mounted in front of the same, each pair of wedges covering fully its associated objective, said optical means producing from the object photographed two laterally displaced images in the focal plane of said objectives, each pair of wedges being arranged with their hypothenusal faces adjacent each other and separated by an air space and the outer faces of each pair of wedges being parallel to each other, said hypothenusal faces being positioned at such an angle to the optical axis of its associated objective that light rays reflected from other than the object photographed and which would interfere with the light rays passing through the other pair of optical wedges strike the hypothenusal faces within the limit angle of total reflection and are directed away from the focal plane, while the light rays reflected from the object photographed pass unobstructed through said faces to the focal plane of the camera.

FRITZ KÖBER.
HANS SAUER.
OTTO VIERLING.